United States Patent [19]

Shustack

[11] Patent Number: 5,128,387

[45] Date of Patent: Jul. 7, 1992

[54] EXTENSIBLE AND PASTEURIZABLE RADIATION CURABLE COATING FOR METAL

[75] Inventor: Paul J. Shustack, Cincinnati, Ohio

[73] Assignee: Borden, Inc., Columbus, Ohio

[21] Appl. No.: 552,857

[22] Filed: Jul. 13, 1990

Related U.S. Application Data

[63] Continuation of Ser. No. 134,975, Dec. 18, 1987, abandoned, which is a continuation-in-part of Ser. No. 78,765, Jul. 28, 1987, abandoned.

[51] Int. Cl.⁵ .............................................. C08F 2/46
[52] U.S. Cl. .................................... 522/92; 522/33; 522/91; 522/93
[58] Field of Search ....................... 522/91, 92, 80, 33

[56] References Cited

U.S. PATENT DOCUMENTS

| | | | |
|---|---|---|---|
| 3,266,930 | 10/1966 | Emmons et al. ................... | 117/132 |
| 3,297,745 | 7/1967 | Fekete et al. ..................... | 260/471 |
| 3,300,547 | 8/1967 | Gorman et al. .................... | 260/885 |
| 3,554,886 | 5/1971 | Colomb, Jr. et al. ............. | 204/159.12 |
| 3,660,145 | 5/1972 | Johnson ............................ | 525/922 |
| 3,759,807 | 3/1973 | Osborn et al. .................... | 204/159.23 |
| 3,888,830 | 2/1975 | Ogasawara et al. ............... | 260/75 |
| 3,888,912 | 5/1975 | Burguette ......................... | 260/486 |
| 3,895,171 | 6/1975 | Deamud et al. ................... | 428/461 |
| 3,898,828 | 8/1975 | Cassai ............................... | 72/117 |
| 3,912,670 | 10/1975 | Huemmer et al. ................ | 260/23 |
| 3,935,173 | 7/1976 | Ogasawara et al. .............. | 260/78.5 |
| 4,001,097 | 8/1977 | Ogasawara et al. .............. | 204/159.16 |
| 4,048,259 | 7/1977 | Wegemund et al. .............. | 260/881 |
| 4,100,046 | 1/1978 | Hodakowski et al. ............ | 204/159.23 |
| 4,180,598 | 5/1979 | Emmons ........................... | 427/44 |
| 4,204,010 | 5/1980 | Kramm ............................. | 522/96 |
| 4,209,371 | 10/1980 | Lee .................................. | 204/159.22 |
| 4,234,399 | 11/1980 | McDowell ........................ | 522/92 |
| 4,288,479 | 9/1981 | Brack ............................... | 522/92 |
| 4,303,696 | 12/1981 | Brack ............................... | 522/92 |
| 4,307,155 | 12/1981 | Broxterman et al. ............ | 428/514 |
| 4,308,185 | 12/1981 | Evans et al. ..................... | 260/29.2 |
| 4,319,009 | 4/1982 | Friedli et al. .................... | 526/62 |
| 4,341,103 | 7/1982 | Escallon ........................... | 72/70 |
| 4,343,885 | 8/1982 | Reardon ........................... | 522/121 |
| 4,357,219 | 11/1982 | Sattler ............................. | 522/92 |
| 4,443,568 | 8/1984 | Woo ................................. | 523/406 |
| 4,472,019 | 9/1984 | Bishop ............................. | 522/92 |
| 4,478,894 | 10/1984 | Tanaka et al. ................... | 427/388.2 |
| 4,480,058 | 10/1984 | Ting et al. ....................... | 523/404 |
| 4,481,258 | 11/1984 | Sattler ............................. | 522/92 |
| 4,482,671 | 11/1984 | Woo et al. ....................... | 525/31 |
| 4,499,175 | 2/1985 | Curtis .............................. | 522/102 |
| 4,503,086 | 3/1985 | Schultz ............................ | 427/54.1 |
| 4,514,468 | 4/1985 | Lucey .............................. | 428/418 |
| 4,522,465 | 6/1985 | Bishop ............................. | 522/92 |
| 4,563,887 | 1/1986 | Bressan ........................... | 72/84 |
| 4,565,713 | 5/1986 | Schultz ............................ | 427/54.1 |
| 4,600,649 | 7/1986 | Leo .................................. | 522/92 |
| 4,609,612 | 9/1986 | Berner ............................. | 522/92 |
| 4,774,839 | 10/1988 | Caleffi ............................. | 72/356 |

FOREIGN PATENT DOCUMENTS 177791 10/1986 European Pat. Off. .
60112809 3/1985 Japan .
61004714 2/1986 Japan .

OTHER PUBLICATIONS

R. J. Thompson, "Advances in UV Curing of Two-Piece Cans", Society of Manufacturing Engineers, Technical Paper (Sep. 1986).
G. M. Patel, "Commercialization of UV Curable Overcoat for 2-Piece Aluminum Cans", Society of Manufacturing Engineers, Technical Paper (Sep. 1982).
Lee et al., "Epoxy Resins—Their Applications and Technology", McGraw-Hill Book Company, Inc. (1957).
Holman, ed., "U.V. and E.B. Curing Formulation for Printing Inks, Coatings and Paints", p. 54 (1984).
"Irgacure 184 Photoinitiator for Ultraviolet Curing of Coatings", Ciba-Geigy Corp. (1982).
"Chlorinated Paraffins", Neville Chemical (Undated).
"Monomer QM-589", Rhom and Haas Company (Mar. 1980).
"EBECRYL 19-6350 UV/EB Curable Slip Agent", Radcure Specialties, Inc. (Jan. 1984).
"Technical Data—Shamrock S-395", Shamrock Chemicals Corporation (Dec. 1986).
"Technical Data—Shamrock SST 14 3", Shamrock Chemical Corporation (May 1986).
EBECRYL 19-6170 UV/EB Curable Adhesion Promoter", Radcure Specialties, Inc. (Jan. 1984).
CELRAD 3702 UV/EB Curable Resin", Interez, Inc. (1986).
"Photomer 5007", Diamond Shamrock Chemicals Company (Undated).
"CHEMPOL 19-4883 UV/EB Curable Resin", Radcure Specialties, Inc. (Jan. 1984).
"Resin Descriptions", Cargill, Inc. (Undated).
"CELRAD 3200 UV/EB Curable Resin", Interez, Inc. (Undated).

(List continued on next page.)

Primary Examiner—Marion E. McCamish
Assistant Examiner—Mark A. Chapman
Attorney, Agent, or Firm—Venable, Baetjer, Howard & Civiletti

[57] ABSTRACT

An extensible and pasteurizable radiation curable coating for metal and a process for preparing a metal article coated therewith are provided. The composition comprises a bulky acrylate or methacrylate monomer; a specific combination of oligomers; and an acidic adhesion promoter. Optionally, the composition may comprise one or more additives such as a photoinitiator; abrasion resistance, slip, and flow-out additives; wetting promoters; and extender resin. The process comprises the steps of applying a coating to one surface of a metal article and curing the coating, wherein the coating is as defined above.

34 Claims, No Drawings

OTHER PUBLICATIONS

"CELRAD 3201 UV/EB Curable Resin", Interez, Inc. (Undated).
"CELRAD 3500 UV/EB Curable Resin", Interez, Inc. (Undated).
"CELRAD 3600 UV/EB Curable Resin", Interez, Inc. (Undated).
"CELRAD 3700 UV/EB Curable Resin", Interez, Inc. (Undated).
"CELRAD 3701 UV/EB Curable Resin", Interez, Inc. (Undated).
"CELRAD 3702 UV/EB Curable Resin", Interez, Inc. (Undated).
"CMD 3703 UV/EB Curable Resin", Interez, Inc. (Undated).
"CELRAD 3800 UV/EB Curable Resin", Interez, Inc. (Undated).
"CMD 6700 UV/EB Curable Resin", Interez, Inc. (Undated).
"CMD 8800 UV/EB Curable Resin", Interez, Inc. (Undated).
"EBECRYL 19-6600 UV/EB Curable Resin", Radcure Specialties, Inc. (Jan. 1984).
"EBECRYL 19-6616 UV/EB Curable Resin", Radcure Specialties, Inc. (Jan. 1984).
"EBECRYL 19-6108 UV/EB Curable Resin", Radcure Specialties, Inc. (Jan. 1984).
"CHEMPOL 19-4824 UV/EB Curable Resin", Radcure Specialties, Inc. (Jan. 1984).
"CHEMPOL 19-4825 UV/EB Curable Resin", Radcure Specialties, Inc. (Jan. 1984).
"EBECRYL 19-6605 Epoxy Acrylate Oligomer to Radiation Cure Applications", Radcure Specialties, Inc. (Apr. 1985).
"EBECRYL 19-6264 UV/EB Curable Resin", Radcure Specialties, Inc. (Jan. 1984).
"EBECRYL 19-6254 UV/EB Curable Resin", Radcure Specialties, Inc. (Jan. 1984).
"EBECRYL 19-6230 UV/EB Curable Resin", Radcure Specialties, Inc. (Undated).
"EBECRYL 19-6220 UV/EB Curable Resin", Radcure Specialties, Inc. (Jan. 1984).
"CHEMPOL 19-4882 Urethane Acrylate", Radcure Specialties, Inc. (Aug. 1985).
"CHEMPOL 19-4868 UV/EB Curable Resin", Radcure Specialties, Inc. (Jan. 1984).
"CHEMPOL 19-4858 UV/EB Curable Resin", Radcure Specialties, Inc. (Jan. 1984).
"CHEMPOL 19-4854 UV/EB Curable Resin", Radcure Specialties, Inc. (Undated).
"CHEMPOL 19-4848 UV/EB Curable Resin", Radcure Specialties, Inc. (Jan. 1984).
"CHEMPOL 19-4842 UV/EB Curable Resin", Radcure Specialties, Inc. (Jan. 1984).
"CHEMPOL 19-4835 UV/EB Curable Resin", Radcure Specialties, Inc. (Jan. 1984).
"CHEMPO 19-4833 UV/EB Curable Resin", Radcure Specialties, Inc. (Jan. 1984).
"CHEMPOL 19-4830 UV/EB Curable Resin", Radcure Specialties, Inc. (Jan. 1984).
"CHEMPOL 19-4828 UV/EB Curable Resin", Radcure Specialties, Inc. (Jan. 1984).
"CHEMPOL 19-4827 UV/EB Curable Resin", Radcure Specialties, Inc. (Jan. 1984).
"CHEMPOL 19-4815 UV/EB Curable Resin", Radcure Specialties, Inc. (Jan. 1984).
"UVITHANE 892 OLIGOMER", Morton Thiokol, Inc. (Dec. 1984).
"UVITHANE 783 OLIGOMER", Morton Thiokol, Inc. (Jan. 1984).
"UVITHANE 788 OLIGOMER", Morton Thiokol, Inc. (Jul. 1983).
"PRODUCT INFORMATION", Radcure Specialties, Inc., Price List effective Apr. 1, 1987.

EXTENSIBLE AND PASTEURIZABLE RADIATION CURABLE COATING FOR METAL

This application is a continuation of Ser. No. 134,975, filed Dec. 18, 1987, which is in turn a continuation-in-part of Ser. No. 78,765, filed Jul. 28, 1987, both now abandoned.

BACKGROUND OF THE INVENTION

The present invention relates to a radiation curable coating composition for metal surfaces and to a process for preparing such coated metal surfaces.

It is known in the art to use conventional solvent-based, heat-curable coatings and inks on aluminum cans. There are conventional, solvent-based, thermally cured ink and coating systems that can withstand mechanical working and thermal cycling, after curing, without failure of the bond between the ink or coating and the metal surface. The metal working might involve, for example, with an aluminum can, a die-and/or spin-neck process, followed by pasteurization in hot water. The spin-neck and die-neck processes involve stretching and necking down of the can to allow for the use of less expensive, smaller diameter can tops. The coatings and inks must adhere to the cans throughout and after these processes and through subsequent pasteurization. While there are conventional, solvent-based, thermally cured ink and coating systems that are suitable for such applications, Federal Regulations inhibit their use because of their solvent content. Also, the cure speed for such coatings is undersirably slow.

Radiation-curable inks and coatings for aluminum cans have been developed, and are available that are free of volatile organic solvents. For example, U.S. Pat. No. 3,912,670 to Huemmer et al., relates to radiation curable coating compositions for metal containers comprising a radiation curable oil, an optional radiation curable oligomer such as an acrylated or methacrylated epoxy compound, a flow control additive, and a reactive solvent which may be a mixture of acrylic acid and at least one other acrylic monomer, e.g., cyclohexyl acrylate. The acrylic acid is said to be critical in forming adhesion between the coating and the aluminum substrate.

U.S. Pat. No. 4,180,598 to Emmons relates to a radiation curable coating for metal (e.g., aluminum) substrates comprising 3-acryloxypropionic acid added to a composition comprising (a) at least one ethylenically unsaturated monomer such as isobornyl acrylate or dicyclopentenyl oxyethyl acrylate, (b) at least one oligomeric vinyl addition polymer of at least one mono-ethylenically unsaturated monomer having a terminal $H_2C=C<$ group, and (c) at least one acrylated oligomeric product having at least two acryloxy groups. The 3-acryloxypropionic acid is said to improve the adhesion of the cured coating to metal substrates.

It is also known to produce radiation curable primer coatings for metal substrates such as steel pipe. European Patent Application 0 177 791 A2 relates to a radiation curable primer coating composition which is applied to a steel substrate prior to application of a polyolefin coating. This primer coating composition comprises the reaction product of an epoxide with an ethylenically unsaturated monocarboxylic acid, a compound such as dicyclopentenyl acrylate, an epoxy compound, and optionally, an oligomer such as an unsaturated polyurethane such as is produced by reacting trimethylolpropane, tolylene diisocyanate, and hydroxyethyl acrylate.

However, the radiation curable can coatings that are known in the art are deficient in that, once cured on a metal substrate, they are not generally capable of withstanding working of the metal, such as would occur in shaping a can body by spin and die necking, especially where there is a subsequent heat treatment such as pasteurization in hot water. Prior art coatings have limited ductility, flexibility, and extensibility, and tend to shrink upon curing, so that the coating tends to part from the metal substrate.

SUMMARY OF THE INVENTION

Accordingly, a radiation curable coating composition that is especially useful for metal containers has been developed which is capable of curing in the presence of ionizing radiation to form a cured coating having a maximum shrinkage of about 15 percent and an elongation at break of at least 5 percent and which remains adhered to its metal substrate subsequent to working to shape the substrate and a pasteurizing treatment at temperatures of from about 40° C. to about 100° C.

The coating composition comprises:

(a) from about 15 to about 75 percent by weight of at least one ethylenically unsaturated "bulky" monomer as hereafter defined, preferably of the formula

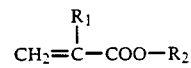

wherein $R_1$ is selected from the group consisting of H and $CH_3$, and wherein $R_2$ is a cyclic or multicyclic group selected from the group consisting of isobornyl, dicyclopentenyl, dicyclopentenyl oxyethyl, cyclohexyl, 3,3,5-trimethyl cyclohexyl, phenyl, benzyl, naphthyl, substituted derivatives thereof and mixtures thereof;

(b) about 10 to about 80 percent by weight of an oligomer component that is a mixture of: (i) at least one of a urethane acrylate oligomer or urethane methacrylate oligomer; and (ii) at least one of an epoxy acrylate oligomer or epoxy methacrylate oligomer; and (c) from about 0.3% to about 10% by weight of an acidic adhesion promoter;

said percentages being based on the combined weight of (a) plus (b) plus (c).

Other additives are preferably incorporated in the composition, to impart desirable properties.

A process for preparing a coated metal container has also been developed. The process comprises the steps of applying a radiation curable coating composition to the external surface of a metal article and curing the coating by radiation, wherein the radiation curable coating composition is as defined above, and wherein the cured coating essentially maintains its bond to the metal surface during and subsequent to mechanical working of the metal.

DESCRIPTION OF THE PREFERRED EMBODIMENTS

The invention relates to radiation curable coating compositions for metal surfaces. These compositions can be used to form coatings on surfaces of articles made of nickel, nickel-copper alloys, steel, metallized plastics, and aluminum and its alloys, for example. One of the objectives in developing these compositions was to produce compositions useful in forming coatings on metal surfaces that would remain bonded, after curing, to the metal surfaces even when the metal articles were worked. Thus in preferred embodiments of the invention the coated metal article can be formed or stretched, and the cured coating will still maintain its bond to a metal surface.

A preferred application for these coating compositions is in the production of beverage cans, such as aluminum beer cans. In the production of an aluminum beer can, a can cup is formed from a sheet of aluminum of desired thickness. The can cup is then washed and dried, the washing usually involving treatment of the internal and external surfaces of the can with alkaline and acid baths. The external surface of the can is coated with the coating of the present invention and radiation cured in the manner which will be described below. The dry can cup is then coated over its internal surface with a food grade coating that also can withstand working, generally one that is thermally cured. The internal coating may be any one of several presently available food grade coatings, and forms no part of the present invention.

The coating compositions of the present invention are particularly designed for application to the external surfaces of an aluminum can. These compositions may be used to form a single protective coating. The coating may be a single pigmented layer or the pigmented layer may be overcoated with a clear layer. Generally, overcoating with a clear layer is the preferred approach, using a single pass through curing radiation equipment for curing and hardening both layers at the same time. Alternatively, though less preferably, the pigmented layer may be cured before applying the overcoat.

When the coatings of the present invention are used on the external surfaces of beverage containers, where the beverage requires pasteurization, ordinarily the container will be coated, the coating will be cured, the container will then be subjected to mechanical working as necessary, filled with the beverage, closed, and pasteurized. The pasteurization process may be carried out in any conventional way, for example by immersion in hot water for a suitable period of time. The single pasteurization step can be used to effect pasteurization of both the beverage and the lined and coated can, or the beverage can be pasteurized before it is loaded into the pasteurized can. If the can contents do not need pasteurization, then the lined and coated can may be subjected to a pasteurization process that will permit it to be filled with edible material safely.

The composition of the present invention displays excellent adhesion under conditions of working and pasteurization due to the carefully selected combination and proportion of the several components of the composition, which confer low shrinkage, extensibility, and ductility on the composition.

The composition of the invention contains three essential ingredients. These are an oligomeric component, a bulky monomer component, and an adhesion promoter. These three components are described in more detail below. In addition to these essential components, a photoinitiator may be included. If the coating is cured using an electron beam process, a photoinitiator is not needed. For UV and other types of radiation curing, the photoinitiator is usually an essential component. Other ingredients whose use is desirable include modifiers and additives such as one or more of each of an abrasion resistance additive, a slip agent, a smoothing agent, an additive to improve wetting, something to impart water resistance, and an extender resin component. Pigments and dyes may be included to achieve desired visual effects.

Taking the three essential components as providing 100 percent by weight of the "basic composition" for application to metal surfaces, the bulky monomer component may be present in the composition in the range from about 15%, preferably about 19.5%, to about 75% by weight, based on the weight of the three essential components. A preferred range is from about one-third to about two-thirds of the composition. A more preferred range is from about 40% to about 60% of the composition formed by the three essential components.

The oligomeric component is preferably provided by a mixture of oligomeric components, selected to result in a balance of desired properties in the cured composition. Generally the selection of the individual oligomeric components can best be developed by trial and observation. However, taking the oligomeric component as a whole, it may be present in an amount in the range from about 10%, preferably about 15%, to about 80% by weight of the composition. A preferred range is from about 20% to about 60%, and a more preferred range is from about 25% to about 50% by weight, based on the weight of the three essential components.

The adhesion promoter is an acidic component or one providing acidic functionality. The acidic property appears to be necessary in order for the cured composition to have adequate adhesion or bonding to the metal surface to which the composition is applied. The adhesion promoter may be an acid, or an anhydride, or a phosphate ester or the like having acidic functionality.

The preferred acidic adhesion promoters are those materials containing ethylenic unsaturation that is compatible, for polymerization purposes, with the unsaturation of the bulky monomer component and of the oligomeric component. A suitable monomer having acidic functionality may derive its acidic functionality from a carboxylic or sulfonic acid group, or an acid anhydride group, or a phosphate ester group that has acidic functionality, or the like. Similarly, the acid functional group may be pendant as a side chain from an oligomeric backbone, as in carboxy modified oligomers.

Generally the acidic functional ethylenically unsaturated monomers are preferred such as, for example, beta-carboxyethyl acrylate or methacrylate. However, it is not necessary for the adhesion promoter to contain the acrylate or methacrylate functionality as long as it contains the acid or acid anhydride functional group and as long as it is soluble in the overall formulation and does not interfere with the polymerization of the composition.

The amount of acidic adhesion promoter that is required is relatively small, but it appears to be necessary in order to achieve adequate adhesion. Since it is the acid functionality that is important, weight percentage proportions of the acidic adhesion promoter are not as meaningful when the promoter is an acidic oligomer as when the promoter is an acid per se, such as, for example, a sulfonic acid or a sulfonic anhydride. However, for an acid functional monomer like betacarboxyethyl acrylate, the range of effective proportions is generally from about 0.3% or more, up to about 10%, the upper limit being generally selected on the basis of economics and properties. Generally from about 1% to 2% of the acidic adhesion promoter is adequate for a monomer like betacarboxyethyl acrylate.

When the composition is intended for radiation curing other than by the use of an electron beam, a photoinitiator is incorporated. Generally the amount of photoinitiator required depends on its efficiency, but likely will fall in the range from about 0.3 parts to about 10 parts by weight per 100 parts by weight of the basic composition. A preferred amount is in the range from about 5 to 7 parts.

There are other categories of materials that may be added to the basic composition advantageously. One of these categories consists of additives imparting slip and abrasion-resistance, wetting, flow-out, and water resistance. The second category is an extender component. The extender component comprises one or more compatible, generally non-functional resins that can be added to reduce the coating cost without substantial deleterious effect on the functional properties of the coating composition. It is also possible, of course, to add dye and pigment materials, for printing or for the achievement of other visual effects.

The first essential component, and generally the major monomeric unsaturated component of the basic composition, is at least one ethylenically unsaturated bulky monomer of the formula

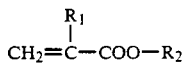

wherein $R_1$ is selected from the group consisting of H and $CH_3$, and wherein $R_2$ is a bulky or sterically encumbering group that imparts bulk to the monomer molecule. $R_2$ is preferably selected from the group consisting of isobornyl, dicyclopentenyl, dicyclopentenyl oxyethyl, cyclohexyl, and 3,3,5-trimethyl cyclohexyl, and other substituted derivatives of the above. Suitable substituents include alkyl groups having up to six carbon atoms, alkoxy groups having up to six carbon atoms, hydroxyl groups and halo groups. In general, any substituent may be used insofar as it does not render the monomer solid. Bulky aromatic groups such as phenyl, benzyl, naphthyl, and alkyl substituted derivatives of these are also suitable bulky groups.

The bulky monomer is one which, when cured to form a homopolymer, is characterized by a shrinkage which does not exceed 15%.

The bulky monomer or monomers are thought to confer the desirable property of ductility on the composition. The incorporation of the desired amount of a bulky acrylate or methacrylate monomer into the composition results in, upon polymerization in the presence of radiation, a polymer having bulky side chains pendant off of the backbone. The bulky pendant groups are thought to give rise to a large amount of free volume in the polymer matrix. Since there is free volume space available, molecular relaxation motion can occur, resulting in the desirable ductile behavior.

A bulky monomer is preferably one which contains a cyclic or multicyclic group or groups capable of imparting ductility to the cured polymer. Two preferred monomers are isobornyl acrylate and dicyclopentenyl acrylate.

The second essential component of the basic composition is the oligomer component that is a mixture of acrylated and/or methacrylated oligomers. Each species of acrylated or methacrylated oligomer confers its own desirable properties on the radiation curable composition.

The oligomer component comprises a mixture of at least one of a urethane acrylate or methacrylate oligomer and at least one of an epoxy acrylate or methacrylate oligomer. Each of these oligomers imparts a specific property or function upon the coating composition. The acrylated or methacrylated urethane oligomer confers extensibility. The acrylated or methacrylated epoxy oligomer confers the desirable properties of abrasion resistance and improved cure speed. By carefully choosing the proportions of these and other optional oligomers in the acrylated or methacrylated oligomer component, and the amount of this total oligomer component used, it is possible to formulate a coating composition having each of these desirable characteristics upon curing.

Also important is the relative proportion of each of the two or more oligomers. Preferebly the oligomer mixture comprises from about 10 to about 90 parts by weight of the acrylated or methacrylated urethane oligomer, and 10 to about 90 parts by weight of the acrylated or methacrylated epoxy oligomer, based on 100 parts of the oligomer composition.

If less than about 10 parts of the acrylated or methacrylated epoxy oligomer are used, cure speed is decreased and abrasion resistance is decreased.

If less than about 10 parts of the acrylated or methacrylated urethane oligomer are used, extensibility suffers.

A preferred urethane acrylated oligomer is an acrylated urethane resin such as Ebecryl 4883 available from Radcure Specialties, Inc., Norfolk, Va., previously sold as Chempol 19-4883. This particular material is supplied at about 85% polymer solids by weight in tripropylene glycol diacrylate. This is a urethane oligomer in which the reactive monomer is actually the tripropylene glycol diacrylate, which is present in an amount of about 15% by weight. The material has an Acid Value in the range up to about 3. Its viscosity at 140° F. (60° C.) is usually in the range from about 2800 to about 4200 cps. Weight per gallon is about 9.2 lbs. The molecular weight of this urethane oligomer is approximately 1600.

Other suitable urethane oligomers include Radcure Specialties' Ebecryl 254 and 264. Both of these products are about 85% by weight of acrylated urethane polymer solids in 1,6-hexanediol diacrylate (reactive monomer) and have a molecular weight of about 2,000. Other acrylated urethanes include the following: Ebecryl 230 (containing 100% by weight of aliphatic based acrylated urethane solids and having a molecular weight of about 5,000); Ebecryl 220 (containing 100% by weight of aromatic based acrylated urethane solids and having a molecular weight of about 1,000); Ebecryl 4882 (containing about 85% by weight polymer solids in oxyethylated phenol acrylate); Ebecryl 4868, 4848, 4830 and 4835 (containing about 70%, 80%, 90% by weight, respectively, of polymer solids in tetraethyleneglycol diacrylate reactive monomer); Ebecryl 4858 (containing 100% by weight acrylated urethane solids and having a molecular weight of about 442); Ebecryl 4854 (containing 100% by weight of aliphatic based acrylated urethane solids and having a molecular weight of about 2986); Ebecryl 4842 (containing 100% by weight acrylated urethane containing co-reacted silicone); Ebecryl 4833 and 4828 (containing about 90% and 76.4% by weight, respectively, of polymer solids in N-vinyl 2-pyrrolidone and having molecular weights of about 1,206 and 1,554, respectively); Ebecryl 4827, previously sold as Chempol 19-4827, (containing 100% by weight of acrylated aromatic urethane solids and having a molecular weight of about 1,500); Ebecryl 4815 (containing about 51% by weight polymer solids in trimethylolpropane triacrylate reactive monomer and having an oligomer molecular weight of about 1200); all from Radcure Specialties, Inc.

Additional acrylated urethane oligomers include Uvithane 892, Uvithane 783, and Uvithane 788, all urethane oligomers from Morton Thiokol, Inc., Princeton, N. J.; and CMD 6700 and 8800, acrylated urethanes based on an aromatic and aliphatic isocyanate, respectively, both from Interez, Inc., Louisville, Ky.

A further group of urethane oligomers are available from Cargill, Inc., Minneapolis, Minn. These are acrylated aliphatic urethane oligomers available as 1511, 1512, 1513, 1521 and 1522.

In general, urethane acrylates and methacrylates may be obtained by reacting isocyanate groups of a polyisocyanate, such as hexamethylene diisocyanate, with a hydroxyalkyl acrylate or a hydroxyalkyl methacrylate, such as, for example, hydroxyethyl acrylate. Such polyurethane polyacrylate oligomers are disclosed in U.S. Pat. No. 3,297,745.

A preferred epoxy diacrylate oligomer is a nonvolatile diacrylate ester of a modified bisphenol A type epoxy resin such as Novacure 3702, available from Interez, Inc., Louisville, Ky., previously sold as CELRAD 3702, from the Celanese Plastics and Specialties Co., Louisville, Ky. This particular resin is a nonvolatile diacrylate ester of a modified bisphenol A type epoxy resin. It is characterized by the superior chemical resistance that is typical of an epoxy resin, when cured. It has a light color, good flow and leveling properties, good wetting properties for pigments, good resistance to solvents and to water when cured, and imparts a high gloss to a cured coating of which it is a component. Its maximum Acid Value is about 3. Its weight per epoxide is a minimum of 16,000. Viscosity at 65° C. is about 2200 cps. It weighs about 9.6 lbs. per gallon at room temperature.

In place of the preferred epoxy diacrylate oligomer described above, other epoxy diacrylate oligomers may be used. For example, another oligomeric ingredient that could be used is available as Epocryl resin DRH-370 from Shell Chemical Co. This material is the diacrylate ester of liquid bisphenol A epoxy resin, and it has a viscosity of about 9000 poises at 77° F. and a density of about 10.0 lbs. per gallon.

Other suitable epoxy acrylate oligomers include Novacure 3200, 3201 and 3500 (acrylate esters of an aromatic/aliphatic epoxy blend); Novacure 3600 and 3703 (amine modified diacrylate esters of bisphenol A type epoxy resins); Novacure 3700 and 3701 (diacrylate esters of bisphenol A type epoxy resins); and Novacure 3800 (an acid functional diacrylate ester of a bisphenol A type epoxy resin), all from Interez, Inc., Loiusville, Ky.

Still other suitable epoxy oligomers include Ebecryl 6600 (which is equivalent to Novacure 3700); Ebecryl 6616 (containing about 75% by weight of acrylated epoxy oligomer solids in trimethylolpropane triacrylate reactive monomer and having an oligomer molecular weight of about 500); Ebecryl 6108 (containing about 80% by weight of a diacrylate ester of a bisphenol A epoxy resin in a reactive monomer and having an oligomer molecular weight of about 500); Ebecryl 4824 (containing 100% by weight of epoxy acrylate oligomer solids and having a molecular weight of about 1,416); Ebecryl 4825 (containing 100% by weight of a diacrylate ester of bisphenol A epoxy resin and having a molecular weight of about 514); and Ebecryl 6605 (containing about 75% by weight of epoxy acrylate oligomer solids in tripropylene glycol diacrylate reactive monomer); all from Radcure Specialties, Inc., Norfolk, Va.

Yet another group of suitable epoxy oligomers include acrylated aromatic epoxy oligomers sold as 1750, 1572, 1573, 1551 and 1552, all from Cargill, Inc., Minneapolis, Minn.

In a preferred embodiment, the oligomer component also comprises a polyester acrylate or methacrylate oligomer. This oligomer optimizes adhesion and flexibility of the composition. When used, the total oligomer mixture comprises about 5 to about 50 parts by weight of the acrylated or methacrylated polyester oligomer, based on the weight of the three types of oligomers.

Preferred polyester oligomers include acrylated polyester oligomers and methacrylated polyester oligomers. One preferred polyester acrylate oligomer is an aliphatic hexafunctional polyester acrylate oligomer such as is available from Henkel Corporation, Morristown, N.J., under the trademark Photomer 5007. This oligomer is the low viscosity reaction product of a modified polyol with acrylic acid. This is a clear, pale yellow liquid, having an acid value, maximum, of 7 milligrams KOH/gm, and a maximum hydroxyl value of 30 mg of KOH/gm. It has a specific gravity at 25° C. of about 1.099, and a weight per gallon at 25° C. of about 9.17 lbs. Its molecular weight is about 2,000, and its viscosity if in the range from 2,000 to 3,000 cps, Brookfield. It has approximately a 10% to 15% shrinkage on cure. It is a material that is recommended for use in combination with acrylate monomers to form a highly reactive system.

Other polyester acrylate or methacrylate oligomers may also be employed. These would include, for example, polyesters having at least two acrylate or methacrylate groups obtained by esterifying hydroxyl groups with acrylic acid or methacrylic acid as disclosed in U.S. Pat. No. 3,935,173.

The combined percentage of the two or more oligomeric ingredients that together form the oligomeric component in the base coating composition is from about 10% or preferably about 15% to about 80%, as discussed above. The proportions of the oligomeric ingredients should be such that, when cured, the cured product has at least five percent elongation at break.

The third essential ingredient of the composition is the acidic adhesion promoter which promotes adhesion between the metallic substrate and the radiation curable resin coating composition. Suitable adhesion promoters are acidic compounds selected from acrylated or methacrylated sulfonic acid, acrylated or methacrylated sulfonic anhydrides, acrylated or methacrylated carboxylic acid, acrylated or methacrylated carboxylic acid anhydrides, and acrylated or methacrylated phospheric acid.

The acidic adhesion promoter may be acrylated or methacrylated to increase its compatibility with the oligomers and bulky monomers of the invention. A most preferred adhesion promoter is an acrylated phospheric acid such as Ebecryl 170 from Radcure Specialties, Inc., Norfolk, Va., previously sold as Ebecryl 19-6170. This particular radiation curable adhesion promoter comprises 100% polymer solids, although it is in liquid form, having a weight of about 11.3 lbs. per gallon, and a viscosity at 77° F. (25° C.) of approximately 5200 cps.

Generally, the use of acidic materials containing acrylic or methacrylic unsaturation as adhesion promoters is well known and a variety of materials is available and their use is well known to those skilled in the art, such as, for example, 3-acryloxypropionic acid.

Alternatively, an acidic adhesion promoter which does not contain acrylic or methacrylic unsaturation may be used. Examples of such adhesion promoters include acid modified acrylic resins such as Elvacite 2014 and 2028, both from E. I. duPont de Nemours & Co., Wilmington, Del. Also, various rosins, hydrogenated rosins, esterified rosins and hydrogenated esterified resins, may be used. Furthermore, mono-, di- and multibasic organic acids may be used if the acid is solid at room temperature.

If the coating composition is to be cured by an electron beam process, the inclusion of a photoinitiator in the coating composition is not necessary. However, in the case where the radiation curable coating is to be cured by ultraviolet radiation, it is essential to incorporate a photoinitiator in the composition. The photoinitiator, when used, preferably comprises about 0.3% to about 10% by weight of the base coating composition, and most preferably about 5% to about 7% by weight. Suitable photoinitiators include, for example, hydroxy cycloexyl phenyl ketone, benzophenone, hydroxy methyl phenyl propanone, dimethoxy phenyl acetophenone, diethoxy acetophenone, and the like.

Several other optional ingredients may be incorporated into the composition to optimize various properties. One such additive is a polyethylene wax which increases slip and abrasion resistance. Suitable such waxes have softening points in the range of about 190° F. to about 260° F. (about 88° C. to about 127° C.) and melting points in the range of about 200° F. to about 270° F. (about 93° C. to about 132° C.). When used, the wax comprises from about 0.5 to about 3.5 parts by weight based on a total of 100 parts by weight of the basic composition, and preferably from about 1 to about 3 parts by weight.

A suitable polyethylene wax is Shamrock S-395 polyethylene wax, Shamrock Chemicals Corporation, Newark, N.J. Shamrock S-395 polyethylene wax is a highly crystalline grade of polyethylene that is used to impart hardness, abrasion resistance, and anti-blocking characteristics. It is in the form of a white free-flowing powder that has a specific gravity of 0.95, a melt point of 258° F. (about 126° C.), an initial softening point of 212° F. (about 100° C.), and a flash point of 250° F. (about 121° C.). It is available in different particle sizes. The selection of particle size will depend upon anticipated film thickness. While it is available in particle sizes from about 5 micrometers to about 20 micrometers, the smallest available particle size is generally preferred. It can be incorporated into the coating formulation by simple stirring. Another suitable wax is Shamrock S-394, also from Shamrock Chemicals Corporation.

Another optional additive is a fluorinated hydrocarbon such as polytetrafluoroethylene (Teflon). This additive increases the surface slip of the coating, in addition to improving abrasion resistance. Suitable such hydrocarbons have softening points above about 600° F. (about 316° C.). A preferred polytetrafluoroethylene is Shamrock SST-3 micronized polytetrafluoroethylene powder, Shamrock Chemicals Corporation, Newark, N.J. This material is a white free-flowing powder having a particle size of about 5 micrometers. It has a specific gravity of 2.15, a melt point of 610° F. (about 321° C.), and a flash point above 600° F. (about 316° C.). It is insoluble in all known organic solvents. In the coating composition of the invention, this material is dispersed in the other ingredients. It is preferably used in combination with a polyethylene wax, in the proportion of 1 part by weight of this material with two to three parts by weight, approximately, of the polyethylene wax. When used, the polytetrafluoroethylene comprises from about 0.25 to about 1.5 parts by weight, and preferably about 0.5 to about 1.0 parts by weight based on 100 parts by weight of the basic composition.

Still another optional ingredient is a silicone component which improves flow-out and slip properties of the composition. A preferred component is a silicone diacrylate such as Ebecryl 350, available from Radcure Specialties, Inc., Norfolk, Va., previously sold as Ebecryl 19-6350. When used, the silicone component is used in a quantity of from about 0.1 to about 3 parts, and preferably from about 1 to about 2 parts by weight based on 100 parts by weight of the basic composition.

Another optional additive is an inexpensive extender resin, which will not significantly affect the desirable properties of the composition, but which will make the composition less expensive to produce. One suitable extender resin is a chlorinated paraffin such as Unichlor chlorinated paraffin from Neville Chemical, Pittsburgh, Pa.

Any extender resin may be used insofar as it is inert with respect to the remainder of the composition, that is, it does not affect the functional characteristics of the system absent the extender resin and does not impair the ability of the ethylenically unsaturated components to copolymerize; comes in a solid form; and dissolves in the composition. Suitable extender resins include, in addition to chlorinated paraffins, rosins, hydrogenated rosins, esterified rosins, Acryloid resins from Rohm and Haas Corporation, Philadelphia, Pa., and Elvacite resins from DuPont, Wilmington, Del.

When used, the extender resin comprises up to about 25 parts by weight based on 100 parts by weight of the basic composition, and preferably not more than about 15 parts by weight.

Additionally, numerous other mono- or multifunctional monomers which are compatible with the basic composition may be incorporated therein, in an amount of up to 30% by weight of the basic composition, insofar as they do not adversely affect the composition. Examples of such compatible monomers are vinylic compounds such as acrylamide, acrylamide derivatives, vinyl pyrrolidone and other mono- or multi-functional acrylates and/or methacrylates.

Although it is preferred, with respect to environmental considerations, that the formulation of the present invention is free of solvents, it is nonetheless within the scope of the invention to use minor amounts of solvents or of water in the formulation inasmuch as such use does not interfere with the essential properties of the resultant coating.

The radiation curable coating composition of the present invention is suitable for coating the external surface of aluminum cans, such as those used for containing beverages.

The invention further relates to a process for preparing a coated metal article such as a can cup, comprising the steps of applying to the external surface of a metal article the radiation curable coating composition of the present invention and curing the coating by radiation, whereby the coated can is capable of withstanding mechanical working in a spin necking and/or die necking process.

In a specific embodiment, this process comprises the steps of (a) shaping a bare metal sheet into a cylindrical cup suitable for finishing into a can; (b) washing the cup; (c) drying the cup; (d) applying the radiation curable coating composition of the present invention to the external surface of the cup; (e) curing the coating by suitable radiation; (f) reducing the diameter of one end of the cup in a die neck process to form a die necked end; and (g) tapering the die necked end in a spin neck process, wherein the radiation curable coating is as defined above.

It is known in the art to prepare a coated metal can using the steps of shaping metal into a can; washing; drying; applying a coating; curing; and die necking and spin necking the can. However, until the present invention was made, a radiation-curable composition having the necessary adhesion, extensibility, ductility and low shrinkage properties to withstand spin- and die-necking and pasteurization processes did not exist.

Where an edible substance is to be filled into the can, it may be desirable to subject the externally coated can at this time to a pasteurization treatment that will prevent contamination of any beverage or food that is packed in the can.

Ordinary solvent-based coatings, of the kind used in the past, have been designed to withstand the steps of shaping the coated cup part of the can and then heating it. The present invention provides coating compositions that are solvent-free, i.e. essentially free of any volatile organic solvent, yet that have the same properties of being able to resist deformation and heating without losing bond adhesion to the surface of the can.

In many applications, it is desirable to coat the inside of the can with food-grade coatings. These generally are thermally curable. Examples of solvent-free, thermally curable resin coatings that have been used for coating the interior of beverage cans are described in U.S. Pat. Nos. 4,308,185 and 4,408,058. When such coatings are used for the interior of the can cups, the thermal curing step may take place either before or after the radiation curing of the coating on the external surface of the cup. Preferably, the thermal curing of the internal coating takes place after the radiation curable external coating is applied and cured, as this thermal treatment has been found to anneal the external coating, and relax stresses in the molecules of the external coating, thus enhancing adhesion.

In one embodiment of the process, a coated metal container is prepared. In such a process, the first step comprises shaping a metal sheet into a cylindrical can cup. The metal sheet is preferably aluminum, but may be nickel, nickel-copper alloy, or steel. The metal sheet generally is one having very little thickness. The shaping may be performed by cupping and ironing the metal sheet, which may optionally be lubricated in an oil/water emulsion coolant, and then stamping the sheet into short, large diameter cups. Each cup may then be forced by a moving ram through a series of concentric ironing dies to stretch the cup to form a progressively taller cup of progressively smaller diameter.

The next step comprises washing the cup to remove coolant and metal fines from the can cup body. The washing is preferably a series of sequential alkaline and acid baths. Between each bath a fresh water rinse is used, and the final rinse is preferably with deionized water.

The washed cans are then dried to remove the wash water. Drying may be accomplished in an oven.

After drying, the outside surface of the cans may be printed with an ink and then clear coated in, preferably, a wet-on-wet or wet-trap application. In a preferred embodiment of the invention, the ink is a coating composition made up in accordance with the invention, to which pigment has been added. After printing the can appropriately with the ink, the exterior cylindrical surface of the can is then coated with a radiation curable clear coating according to the invention. In order to avoid the need for two curing steps, one for the ink and one for the clear coating, it is desirable to use different photoinitiators in the ink and in the clear overcoating. Thus the photoinitiator in the ink should be one that absorbs ultraviolet radiation at different wavelengths than the photoinitiator in the clear topcoat. For example, the photoinitiator in the ink may be Irgacure ® 907, which has an ultraviolet radiation absorption maxima at 305 nm, while the photoinitiator in the clear topcoat may be Irgacure ® 184, which has an ultraviolet radiation absorption maxima at 232 nm. Both Irgacure photoinitiators are available from Ciba-Geigy. Because of the differences in absorption maxima of these two layers, ultraviolet light at 305 nm can easily penetrate the clear top coat and be efficiently absorbed in the ink layer, to initiate curing of the ink. Laser curing may also be used.

In a preferred embodiment, ultraviolet light is used to cure the resin. The cure may be performed in a UV lamp bank having any number of UV lamps. The lamps may be mounted on both sides of the lamp bank with reflectors facing them.

After both inside and outside coatings are cured, the can cup may undergo further processing by a die neck apparatus. This processing reduces the diameter of the upper margin of the open end of the can cup. A further optional die neck step or steps may be performed to further reduce the diameter of a margin of the cup closer to the open end thereof.

Finally, the crimp or crimps that are applied to the top end of the die neck process may be smoothed in a spin neck process to give the can cup a tapered, rather than a ridged, appearance.

The coated cups are then pasteurized to sanitize their surfaces. This may be accomplished by immersing the can cups in water having a temperature from about 40° C. to about 100° C., e.g., about 82° C. (about 180° F.) for a period of about 30 minutes.

Unlike prior art coatings, the coating compositions of the present invention are capable of remaining adhered to the metal structure even under the fairly strenuous conditions of the spin-and die-necking processes as well as pasteurization. This is a result of the careful choice of components in the composition, and of the proportions of the components.

Following pasteurization, the can cups may be rinsed, dried, filled, capped and packaged according to the methods known in the art.

The following Examples serve to further illustrate the invention. In these examples and elsewhere throughout this application, all parts and percentages are by weight, and all temperatures are in degrees Celsius unless expressly stated to be otherwise.

EXAMPLE I

Formulation for the External Coating on an Aluminum Beverage Can 47.25 parts of isobornyl acrylate and 15 parts of Unichlor 70AX chlorinated paraffin extender resin from Neville Chemical, Pittsburgh, Pa. were combined in a mixer.

The resulting mixture was added to a dispersion prepared from: 12.94 parts of Celrad 3702 diacrylate ester of bisphenol A epoxy resin oligomer from Celanese Plastics and Specialties Co., Louisville, Ky.; 8.74 parts of Chempol 19-4883 acrylated urethane oligomer resin from Radcure Specialties, Inc., Port Washington, Wis.; 5.82 parts of Photomer 5007 aliphatic hexafunctional polyester acrylate oligomer from Henkel Corporation, Morristown, N.J.; and 2.50 parts of S395 N2 (5 micrometer size) Shamrock polyethylene wax from Shamrock Chemicals Corp., Newark, N.J. To this mix was added 4.75 parts of Irgacure 184 (1-hydroxycyclohexyl phenyl ketone) photoinitiator from Ciba-Geigy Corp; 1.00 parts of Ebecryl 19-6170 acrylated phosphoric acid adhesion promoter also from Radcure Specialties; 1.00 parts of Ebecryl 19-6350 silicone diacrylate also from Radcure Specialties; and 1.00 parts of Shamrock SST-3 micronized polytetrafluoroethylene.

This mixture was stirred until homogenous, i.e., about 30 minutes at about 40° C. in the mixer.

The initial step in making an aluminum can requires a series of die punches from aluminum flat stock wound off a supply coil. These punches form the aluminum into the familiar constant diameter generally cylindrical cup shape, for the main part of the can. The can cup is then passed through a series of alkaline and acid baths. Between each bath the can cup is rinsed with fresh water, and the final rinse is with deionized water. The can cups are then dried in an oven. After drying, the can cups are printed with ink made by incorporating pigment into a part of the clear coating composition formulated as above. The ink is applied to the exterior surface of the can cup, with desired indicia or solid panels or patterns. The clear coating formulation described above is then applied as a coating over the ink.

The can cups are then passed through an ultraviolet curing unit, which cures the clear coating and the ink at the same time. Next, a water reducible sanitary coating is sprayed over the inside surface of the cup. This coating is then cured in an oven at about 400° F., over a period of about two or two and one-half minutes. The can cup is then ready for mechanical shaping as desired.

To make a soft drink or beer can, a spin necking process is used to reduce the diameter of the cup at its upper end by forming an elongated, narrow neck. First, a die neck step is employed to reduce the diameter of approximately the top ¾ inches of the can cup. A second die neck step reduces the uppermost approximately ½ inch of the can cup even further. The final step is the spin neck step, which produces a somewhat tapered appearance at the upper end of the cup.

At this point the cups may be sold to a beverage manufacturer, or in the case of an in-house operation, they may be pasteurized, filled, and sealed. Alternatively, they may be filled before they are pasteurized, if the contents of the can require pasteurization. If the cans are sold after the spin necking step, the customer may wish to pasteurize the cans by immersion in water at about 180° F. (about 82° C.) for about 30 minutes. The cans are then rinsed, dried, filled, capped, and finally packaged.

Cans printed and overcoated, using the formulation described above, can be expected to maintain their bond through all of this mechanical and heat treatment and can be expected to be quite satisfactory for commerical usage in the beverage container field.

EXAMPLE II

Coating Composition for Protecting a Metal Surface

A radiation curable, clear coating composition was made up as follows:

| Ingredient | Parts by Weight |
| --- | --- |
| Celrad 3702 epoxy diacrylate oligomer, from the Celanese Plastics and Specialties Co. | 20.00 |
| Chempol 19-4883 acrylated aliphatic urethane oligomer | 13.50 |
| Photomer 5007 acrylated polyester oligomer | 9.00 |
| Isobornyl Acrylate | 44.25 |
| Irgacure 184 photoinitiator | 4.75 |
| Ebecryl 19-6170 acrylated phosphoric acid | 1.00 |
| Ebecryl 19-6350 acrylated silicone | 1.00 |
| Fluorad FX-13 acrylated fluorocarbon | 3.00 |
| S394 N1 polyethylene wax, Shamrock | 2.50 |
| SST-3 Teflon wax, Shamrock | 1.00 |

These ingredients were mixed together to form a homogenous mixture. The mixture was then applied to the exterior surfaces of aluminum can cups intended for beverage use. The coated cans were then passed through an ultraviolet radiation curing station at 200 feet per minute. The curing station used ultraviolet lamps providing 300 watts per inch.

The Irgacure 184 photoinitiator was considered to be very efficient. Based on this and additional tests, the amount used of 4.75 parts, which corresponds to 4.75% based on the total composition described above, appeared to be close to the optimum amount. The cure speed of this formulation appeared to be good, effecting good cure without loss of physical properties. Thus, although isobornyl acrylate is not a fast-curing monomer, its slow curing rate seemingly was offset by using the very fast-curing bisphenol A epoxy acrylate oligomer, the fast-curing aliphatic urethane acrylate oligomer, and the moderately fast-curing polyester acrylate oligomer, all of which are identified above.

One important characteristic of this formulation was its good adhesion. It appeared to cure well throughout its thickness, and when applied, had good wetting characteristics with respect to the aluminum substrate. It is believed that the particular acrylated fluorocarbon used lowered the overall surface tension of the formulation and thus enhanced wetting. While the use of the acrylated polyester oligomer contributed to good adhesion, it is believed that an even greater contribution to good adhesion was made by the acrylated sulfonic acid employed.

However, the particular internal sanitary coating was applied to the can cups, it required a heat treatment. This heating step is believed to have enhanced the adhesion of the exterior radiation cured coating significantly, in addition to effecting curing of the interior coating. The heating step also seems to act to anneal the exterior coating and to relax any strains in the polymer chains that may have occurred during the radiation curing step.

EXAMPLE III

A radiation curable, clear coating composition was made up as follows:

| Ingredient | Parts by Weight |
|---|---|
| Celrad 3702 epoxy diacrylate oligomer, from the Celanese Plastics and Specialties Co. | 20.50 |
| Chempol 19-4827 acrylated aromatic urethane oligomer, from Radcure Specialties, Inc. | 20.00 |
| Isobornyl Acrylate | 49.00 |
| Irgacure 184 photoinitiator | 5.00 |
| Ebecryl 19-6170 acrylated phosphoric acid | 1.00 |
| Ebecryl 19-6350 acrylated silicone | 1.00 |
| Shamrock S395 N2 polyethylene wax | 2.50 |
| Shamrock SST-3 micronized polytetrafluoroethylene | 1.00 |

The composition, when printed on the exterior of aluminum cans, had good adhesion thereto.

EXAMPLE IV

Ink Formulation

The ink formulation described below is prepared for applying a "Coke" red ink to an aluminum can cup. The formulation is:

| Ingredient | Parts by Weight |
|---|---|
| Celrad 3702 bisphenol A epoxy acrylate oligomer | 15.13 |
| Chempol 19-4883 acrylated aliphatic urethane oligomer | 7.26 |
| Photomer 5007 acrylated polyester oligomer | 4.84 |
| Isobornyl acrylate monomer | 21.77 |
| Fluorad FX-13 acrylated fluorocarbon | 3.00 |
| Ebecryl 19-6170 acrylated phosphoric acid | 2.00 |
| Ebecryl 19-6350 acrylated silicone | 1.00 |
| Saugatuck Red NB-D 2855 from BASF | 13.90 |
| Watchung Red BRT-870-D from Heubach | 11.50 |
| Novoperm Yellow HR from American Hoechst | 4.90 |
| Ti-Pure Rutile R-900 from DuPont | 10.70 |
| Irgacure 907 photoinitiator | 4.00 |

When printed on the exterior surfaces of aluminum cans and cured by ultraviolet radiation, this ink cures to give a good, abrasion-resistant coating that withstands mechanical working of the can cup and pasteurization, without loss of adhesion.

EXAMPLE V

Ink Formulation

The following formulation was made up to evaluate ink compositions prepared on the basis of the coating compositions of the present invention. The ink formulation described below was prepared for applying a "Coke" red ink to an aluminum can cup. The formulation was:

| Ingredient | Parts by Weight |
|---|---|
| Celrad 3702 bisphenol A epoxy acrylate oligomer | 14.55 |
| Chempol 19-4883 acrylated aliphatic urethane oligomer | 7.00 |
| Photomer 5007 acrylated polyester oligomer | 4.65 |
| Isobornyl acrylate monomer | 24.78 |
| Fluorad FX-13 acrylated fluorocarbon | 2.88 |
| Ebecryl 19-6170 acrylated phosphoric acid | 1.92 |
| Ebecryl 19-6350 acrylated silicone | 0.96 |
| Saugatuck Red NB-D 2855 from BASF | 13.37 |
| Watchung Red BRT-870-D from Heubach | 11.06 |
| Novoperm Yellow HR from American Hoechst | 4.71 |
| Ti-Pure Rutile R-900 from DuPont | 10.29 |
| Irgacure 907 photoinitiator | 3.85 |

When printed on the exterior surface of aluminum cans and cured by ultraviolet radiation, this ink cured to give a good, abrasion-resistant coating that withstood mechanical working of the can cup and pasteurization, without loss of adhesion.

CONCLUSION

Cured coating compositions prepared in accordance with the present invention can be designed to possess several important characteristics that make these compositions valuable not only as protective coatings for metal surfaces generally, but especially for coating aluminum can cups that must be mechanically worked.

The liquid coating formulation must have a viscosity permitting ease of application, and it must have good wetting characteristics for its metal substrate. The cure speed can be adjusted, but as adjusted, must be appropriate for the curing equipment that will be in use. In general the coating should be curable, using an appropriate initiator, if necessary, for curing by any one of the several kinds of radiation curing processes now in use. However, an ultraviolet-curing composition is preferred.

One of the most important characteristics of the formulation is that it must be curable with very low shrinkage. The use of isobornyl acrylate monomer in the formulation is desirable because, among other reasons, it has a very low rate of shrinkage. Generally, however, each of the oligomer components should be selected and used at least in part on the basis of its rate of shrinkage upon curing.

Partly to minimize shrinkage, and partly to enhance the ductility of the cured composition, the use of materials, particularly monomers, that will cause cross-linking is avoided, unless certain modifications to the formulation are made. Thus, while monofunctional and difunctional monomers are included in the formulation, trifunctional and other cross-linking type monomers should only be used if the formulation is adjusted to minimize or offset the shrinkage and/or loss of ductility which may result.

The cured composition must possess some essential characteristics, the most important of which is probably good adhesion to the metal substrate. It should also possess good abrasion resistance and have good water resistance. In order to withstand mechanical working and heat cycling, the cured coating should have good extensibility and good ductility. It must be able to withstand thermal cycling. Except where it is used as a pigmented ink, the coating generally should be clear.

The present invention permits the production of formulations meeting these criteria.

While the invention has been disclosed in this patent application by reference to the details of preferred embodiments of the invention, it is to be understood that this disclosure is intended in an illustrative rather than in a limiting sense, as it is contemplated that modifications will readily occur to those skilled in the art, within the spirit of the invention and the scope of the appended claims.

What is claimed is:

1. A radiation-curable coating composition for application as a coating to a metal surface which is to be subsequently subjected to a metal working step, said composition consisting essentially of:
   (a) from about 15% to about 75% by weight of at least one ethylenically unsaturated bulky monomer of the formula

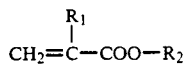

wherein $R_1$ is selected from the group consisting of H and $CH_3$, and wherein $R_2$ is a substituent selected from the group consisting of isobornyl, dicyclopentenyl, dicyclopentenyl oxyethyl, cyclohexyl, 3,3,5-trimethyl cyclohexyl, phenyl, benzyl, naphthyl, substituted derivatives thereof, and mixtures thereof, said bulky monomer being characterized such that, when cured to form a homopolymer, shrinkage does not exceed 15%;
   (b) from about 10% to about 80% by weight of an oligomeric component comprising a mixture of (i) at least one of a urethane acrylate oligomer or urethane methacrylate oligomer and (ii) at least one of an epoxy acrylate oligomer or epoxy methacrylate oligomer; said oligomeric component comprising at least 10% by weight of each of said (i) and (ii) oligomers based on the weight of said mixture; and
   (c) from a small but effective amount up to about 10% by weight of an acidic adhesion promoter;
   said components (a) and (b) being copolymerizable upon curing of said composition, and said percentages being based on the combined weight of (a) plus (b) plus (c), and
   wherein said composition, after application to a metal surface, is curable to form a coating on said metal surface that is characterized by having a shrinkage of not more than 15% and an elongation at break, upon working of the metal, of at least 5%.

2. A composition according to claim 1 wherein oligomer mixture (b) additionally comprises (iii) at least one of a polyester acrylate oligomer or polyester methacrylate oligomer.

3. A composition in accordance with claim 1, wherein acidic adhesion promoter (c) contains ethylenic unsaturation.

4. A composition according to claim 1 that is curable by ultraviolet radiation and that further comprises an effective amount of a photoinitiator.

5. A composition according to claim 1 wherein said metal surface is the external surface of a can cup and wherein said cured coating remains bonded to metal surface subsequent to die necking and spin necking.

6. In a process for preparing a coated metal can cup for producing a can suitable for beverage use comprising
   applying a coating to the external surface of said can cup and curing said coating, and
   subjecting the coated can to mechanical working in a die necking and/or spin necking process,
   the improvement comprising applying to the surface of said can cup the radiation curable coating composition of claim 1 and curing said coating by radiation prior to said die necking and/or spin necking processes,
   said improvement being characterized by the fact that said cured coating essentially maintains its bond to the metal surface during and subsequent to said die necking and spin necking processes.

7. A composition of claim 1 wherein said bulky monomer is present in an amount of from about ⅓ to about ⅔ by weight.

8. A composition of claim 1 wherein said bulky monomer is present in an amount of from about 40% to about 60% by weight.

9. A composition of claim 1 wherein said bulky monomer is present in an amount of from about 47% to about 68% by weight.

10. A composition of claim 1 wherein $R_2$ is isobornyl.

11. A radiation curable coating compostion for application to a metal surface which is to be subsequently subjected to a metal working step, said composition consisting essentially of:
    (a) from about ⅓ to about ⅔ by weight of at least one ethylenically unsaturated bulky monomer of the formula

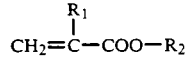

wherein $R_1$ is selected from the group consisting of H and $CH_3$, and wherein $R_2$ is selected from the group consisting of isobornyl, dicyclopentenyl, dicyclopentenyl oxyethyl, cyclohexyl, 3,3,5-trimethyl cyclohexyl, phenyl, benzyl, naphthyl, substituted derivatives thereof, and mixtures thereof;
    (b) from about 20% to about 60% by weight of an oligomeric component comprising a mixture of (i) at least one of a urethane acrylate oligomer or urethane methacrylate oligomer; and (ii) at least one of an epoxy acrylate oligomer or epoxy methacrylate oligomer; said oligomeric component comprising at least 10% by weight of each of said (i) and (ii) oligomers based on the weight of said mixture; and
    (c) from about 0.3% to about 10% by weight of an organofunctional acidic adhesion promoter selected from the group consisting of acrylated sulfonic acid, methacrylated sulfonic acid, acrylated sulfonic acid anhydride, methacrylated sulfonic acid anhydride, acrylated carboxylic acid, methacrylated carboxylic acid, acrylated carboxylic acid anhydride, methacrylated carboxylic acid anhydride, acrylated phosphoric acid, and methacrylated phosphoric acid, said (a) and (b) components being copolymerizable upon radiation curing of said composition, and said percentages being based on the combined weight of (a) plus (b) plus (c), and wherein said composition, after application to a metal surface, is curable to form a coating on said metal surface that is characterized by having a shrinkage of not more than 15% and an elongation at break, upon working of the metal, of at least 5%.

12. The composition of claim 11 wherein oligomer mixture (b) additionally comprises (iii) at least one of a polyester acrylate oligomer or polyester methacrylate oligomer.

13. The radiation curable coating composition of claim 12 wherein said mixture of oligomers (b) comprises a mixture of from about 10% to about 90% by weight of an acrylated epoxy oligomer, from about 10% to about 90% by weight of an acrylated aliphatic urethane oligomer, and from about 5% to about 50% by weight of an acrylated polyester oligomer, wherein said percentages are based on the weight of said mixture of oligomers.

14. The composition of claim 11 that is curable by ultraviolet radiation and that further comprises an effective amount of a photoinitiator.

15. The radiation curable coating composition of claim 14 wherein said acidic adhesion promoter comprises acrylated phosphoric acid.

16. The composition of claim 14 further comprising small but effective amounts of a polyethylene wax and a particulate polytetrafluoroethylene wax both for imparting characteristics of abrasion resistance and slip to the coating upon curing, a small but effective amount of an acrylated silicone for improving the characteristics of flow out and slip of the coating upon curing, and a small but effective amount of an acrylated fluorocarbon for improved wetting ability of the coating prior to curing and improved water resistance.

17. The composition of claim 16 further comprising up to about 15% by weight based on the total composition of an extender resin that does not impair the ability of the ethylenically unsaturated components to copolymerize and does not impair the functional characteristics of the coating upon curing.

18. The composition of claim 17 wherein said extender resin is a chlorinated paraffin.

19. The composition of claim 11 wherein said metal surface is the external surface of a can cup and wherein said cured coating remains bonded to said metal surface subsequent to die necking and spin necking.

20. The composition of claim 11 wherein said metal surface is the exterior surface of a can cup and wherein said coating, after curing, remains bonded to said surface following pasteurization thereof.

21. The radiation curable coating composition of claim 11 wherein said ethylenically unsaturated bulky monomer comprises isobornyl acrylate.

22. The radiation curable coating composition of claim 11 wherein said ethylenically unsaturated bulky monomer comprises dicyclopentenyl acrylate.

23. The composition of claim 11 further comprising a small but effective amount of a polyethylene wax for imparting abrasion resistance and slip to said cured coating upon curing.

24. The composition of claim 11 further comprising a small but effective amount of a particulate polytetrafluoroethylene wax for imparting abrasion resistance and slip to said coating upon curing.

25. The composition of claim 11 further comprising a small but effective amount of silicone diacrylate for imparting improved flow-out and slip characteristics to said coating upon curing.

26. The composition of claim 11 further comprising up to 15% by weight of the total weight of the composition of an extender resin that does not impair the copolymerization of the other materials upon curing nor the functional characteristics of the cured coating.

27. A composition of claim 11 wherein said bulky monomer is present in an amount of from about 40% to about 60% by weight.

28. A composition of claim 11 wherein said bulky monomer is present in an amount of from about 47% to about 68% by weight.

29. A composition of claim 11 wherein $R_2$ is isobornyl.

30. A radiation curable coating composition for metal containers consisting essentially of:
 (a) from about 40% to about 60% by weight of isobornyl acrylate;
 (b) from about 1% to about 72% by weight of a urethane acrylate oligomer;
 (c) from about 1% to about 72% by weight of an epoxy acrylate oligomer;
 (d) from about 0.05% to about 40% by weight of a polyester acrylate oligomer;
 (e) from about 1% to about 2% by weight based on the total composition above of acrylated phosphoric acid;
 (f) from about 5 to about 7 parts by weight of a photoinitiator;
 (g) from about 1 to about 2 parts by weight of silicone diacrylate;
 (h) from about 1 to about 3 parts by weight of polyethylene wax;
 (i) from about 0.5 to about 1 part by weight of finely divided polytetrafluoroethylene; and
 (j) up to about 15 parts by weight of a chlorinated paraffin extender resin;
 said parts by weight being per 100 parts by weight of the combined weight of (a), (b), (c) and (e).

31. The composition of claim 30 wherein said metal surface is the external surface of a can cup and wherein said cured coating remains bonded to said metal surface subsequent to die necking and spin necking.

32. In a process for preparing a coated metal can cup for producing a can suitable for beverage use comprising applying a coating to the external surface of said can cup and curing said coating, and subjecting the coated can to mechanical working in a die necking and/or spin necking process, the improvement comprising applying to the surface of said can cup the radiation curable coating composition of claim 30 and curing said coating by radiation prior to said die necking and/or spin necking processes, said improvement being characterized by the fact that said cured coating essentially maintains its bond to the metal surface during and subsequent to said die necking and spin necking processes.

33. The process of claim 32 comprising, as an additional step, subjecting the coated, worked can to pasteurization, said cured coating maintaining its bond to the can during and subsequent to said pasteurization step.

34. A coated metal can prepared according to the process of claim 33.

* * * * *